(12) United States Patent
Brueggen (10) Patent No.: US 7,140,311 B2
(45) Date of Patent: Nov. 28, 2006

(54) VACUUM PUMP FOR AGRICULTURAL SEEDING EQUIPMENT

(75) Inventor: Shane Brueggen, Cordova, IL (US)

(73) Assignee: Deere & Company, Moline, IL (US)

( * ) Notice: Subject to any disclaimer, the term of this patent is extended or adjusted under 35 U.S.C. 154(b) by 154 days.

(21) Appl. No.: 10/769,475

(22) Filed: Jan. 31, 2004

(65) Prior Publication Data
US 2005/0166814 A1 Aug. 4, 2005

(51) Int. Cl.
*G01F 11/20* (2006.01)
(52) U.S. Cl. .................. 111/200; 222/410
(58) Field of Classification Search ........ 111/183–185, 111/177, 200; 222/410
See application file for complete search history.

(56) References Cited
U.S. PATENT DOCUMENTS 2,874,878 A * 2/1959 Stokland .................... 222/624
4,890,547 A 1/1990 Wagner et al.
5,170,909 A * 12/1992 Lundie et al. ............... 221/211
6,308,646 B1 * 10/2001 Luxon ......................... 111/175
6,644,225 B1 * 11/2003 Keaton ........................ 111/175
6,689,315 B1 * 2/2004 Linker et al. .................. 422/45

* cited by examiner

*Primary Examiner*—Christopher J. Novosad
(74) *Attorney, Agent, or Firm*—The Law Office of Randall T. Erickson, P.C.

(57) ABSTRACT

A vacuum pump for a seed planter includes a housing, an impeller rotated within the housing, and a motor or other drive. The housing has a central inlet and a circumferentially arranged outlet passage. The impeller vanes define air paths that are open to the outlet passage. The impeller has a central aperture for coupling to the output shaft of the drive and an impeller center cap screwed into the central aperture. The impeller has a curved conical center hub that surrounds the central aperture. The center hub and the center cap are configured to smoothly direct air flow to the passages between the vanes to reduce or eliminate a stagnant air region in a center of the impeller. The center cap can also be used as a tool to remove the impeller from the output shaft.

15 Claims, 11 Drawing Sheets

VACUUM PUMP FOR AGRICULTURAL SEEDING EQUIPMENT

TECHNICAL FIELD OF THE INVENTION

The invention relates to vacuum pumps, and particularly vacuum pumps used in agricultural seed planters utilizing vacuum controlled seed meters.

BACKGROUND OF THE INVENTION

In a typical agricultural seed planter, a plurality of seed meters are arranged in a row corresponding to furrows to be seeded. Such a seed planter is disclosed in U.S. Pat. No. 6,308,646 or U.S. Pat. No. 6,644,225. Each seed meter is supplied with a supply of seeds. A seed meter disk is rotated within the seed meter in communication with the supply of seeds while a vacuum is applied to an opposite side of the disk. The seed meter discharges seed at a predetermined rate along the furrow. Such a seed meter is disclosed for example in U.S. Pat. No. 5,170,909.

To supply the vacuum to each seed meter, a vacuum pump is arranged on the seed planter. Typically, the vacuum pump used on agricultural seed planters is an off-the-shelf centrifugal fan or blower implemented in such a manner to generate the needed vacuum. These pumps can be large and cumbersome.

The current vacuum pump design for a JOHN DEERE 1700 series planter uses a typical centrifugal fan design with a scroll housing. In such a design, the outlet of the impeller is channeled into a single channel by the impeller housing. The vacuum pump is driven by a hydraulic motor. The current vacuum pump assembly for a JOHN DEERE 1700 series seed planter must be rotated at over 8000 rpm to achieve the necessary pressure drop for the vacuum seed meters to plant the larger corner-condition crops. This rpm requirement can necessitate a costly hydraulic motor for the vacuum pump.

Furthermore, the current JOHN DEERE 1700 series seed planter centrifugal blowers require a special tool to remove the impeller from the hydraulic motor output shaft.

The present inventor has recognized that a need exists for an improved seed meter vacuum pump that can generate sufficient pressure drop or vacuum to dispense larger "corner-condition" crops using vacuum controlled seed meters, at an rpm within a usable range for a cost effective hydraulic motor. The present inventor has recognized that a need exists for a seed meter vacuum pump that can generate an increased pressure drop compared to current centrifugal air blowers used on seed planters, while retaining a compact size.

The present inventor has recognized that a need exists for a seed meter vacuum pump that is easily maintained, including being easily assembled and disassembled.

SUMMARY OF THE INVENTION

The invention provides a vacuum pump for a seed planter that includes a housing, an impeller, and a motor or other drive. The housing has a central inlet and a circumferentially arranged outlet passage. The impeller is arranged to rotate within the housing, the impeller having a central opening in fluid communication with the central inlet, and a plurality of vanes extending radially from the central opening. The vanes define air paths that are open to the outlet passage of the housing. The motor is mounted to the housing and has an output shaft fixed for rotation with the impeller.

Preferably, the vacuum pump housing comprises a housing base and a housing cover fastened to the housing base. The housing cover is planar and the outlet passage is arranged between the housing cover and housing base. The housing base is concave and substantially imperforate.

The design of the impeller allows air to be discharged from the impeller in a 360 degree pattern and avoids channeling the air into a single air stream. This allows the impeller size to be increased without significantly increasing the overall size of the pump.

Preferably, the housing base comprises a shaft opening and the output shaft penetrates the shaft opening. The impeller comprises a central aperture for receiving the output shaft for coupling the output shaft to the impeller and a cap screwed into the central aperture. The cap extends into a central region of the impeller between diametrically opposed base ends of the vanes.

The impeller includes a center hub surrounding the central aperture, located in registry with the impeller inlet, and located between base ends of the impeller vanes. The center hub has a curved, substantially conical taper or shape that acts to smoothly direct the incoming air approximately 90° to enter the air passages between vanes. The center hub and center cap design of the impeller are configured to reduce or to eliminate a stagnant air spot in the center of the impeller by imparting a movement to the incoming air, causing a smooth flow transition to the base ends of the vanes.

Preferably, the vacuum pump comprises a debris shield. The debris shield is arranged at least partially around a circumference of the housing to terminal ends located below a half height of the housing and is used to direct particles passing through the circumferential openings in a downward direction. The debris shield is fastened to the housing and extends partially around the housing in an axial direction.

According to another aspect of the invention, a seed distribution system is provided that includes a plurality of vacuum assisted seed meters, each having an outlet, a vacuum manifold connected to the outlet, and the above described vacuum pump having an inlet connected to the vacuum manifold.

In operation, the impeller assembly is rotated by the shaft, within the space defined by the housing. Air is drawn into the seed meters, through hoses and through the inlet nozzles and into the impeller assembly. The air is pumped by rotation of the impeller assembly radially outward by the vanes and out of the housing through the circumferential outlet passage formed between the housing cover and the housing base. Dust, small seeds, and debris passing through the openings are directed downward by the shield.

As another aspect of the invention, the removal of the impeller from the motor output shaft for maintenance or replacement is simplified. The cap is unscrewed and removed, and the nut is unscrewed and removed. The impeller at this point is effectively press fit onto the drive output shaft and manual removal is difficult. According to this aspect the invention, the cap can be screwed back into the opening, until the end of the shank portion abuts the end of the shaft. Further tightening of the cap drives the impeller off the shaft in the axial direction. In other words, the force generated by the center cap being reinstalled into the threaded region of the central aperture slides the impeller assembly off the taper on the shaft.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
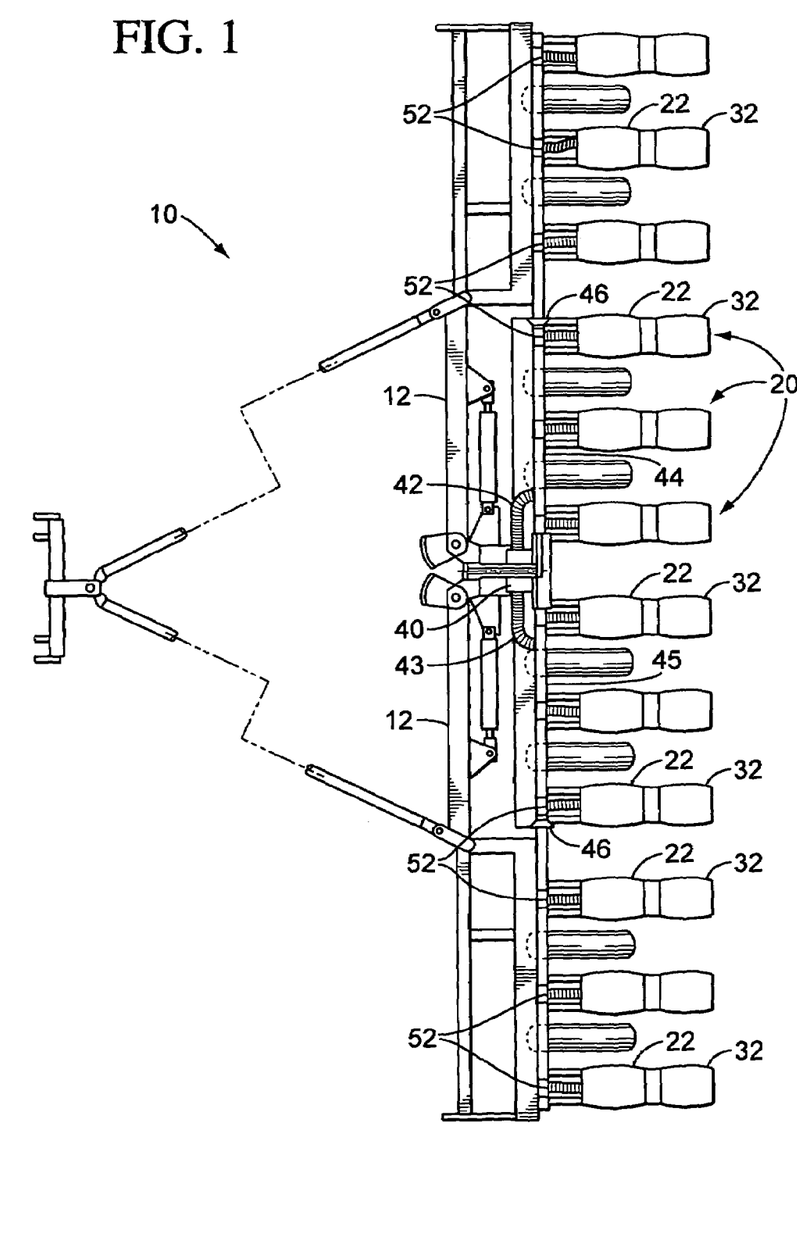
FIG. 1 is a top view of a row crops planter having a plurality of individual planting units.

FIG. 1 is a top view of a seeding machine 10. In the illustrated embodiment, the seeding machine is a row crop planter; however, the present invention could be used on other seeding machines having pneumatic seed meters, including grain drills and air seeders. The planter can be configured as described in U.S. Pat. No. 6,308,646 or 6,644,225, herein incorporated by reference. The planter comprises a frame 12 that can be extended into a working configuration illustrated in FIG. 1 and folded into a transport configuration. A plurality of row crop planting units 20 is mounted to the frame 12.

An air vacuum pump 40 in the form of a fan creates a negative air pressure in two air tubes 42 and 43. The air tube 42 extends between the air pump 40 and the pneumatic manifold 44. The air tube 43 extends between the pump 40 and the pneumatic manifold 45. Each of the pneumatic manifolds 44 and 45 comprises a cylindrical tube that extends along the frame 12. Each of the pneumatic manifolds 44 and 45 comprises two sections that are coupled together by a flapper coupling 46. The flapper coupling 46 allows each of the manifolds to be split apart as the planter frame 12 is being folded and to be rejoined when the planter frame is unfolded into its working configuration.

Figure 2:
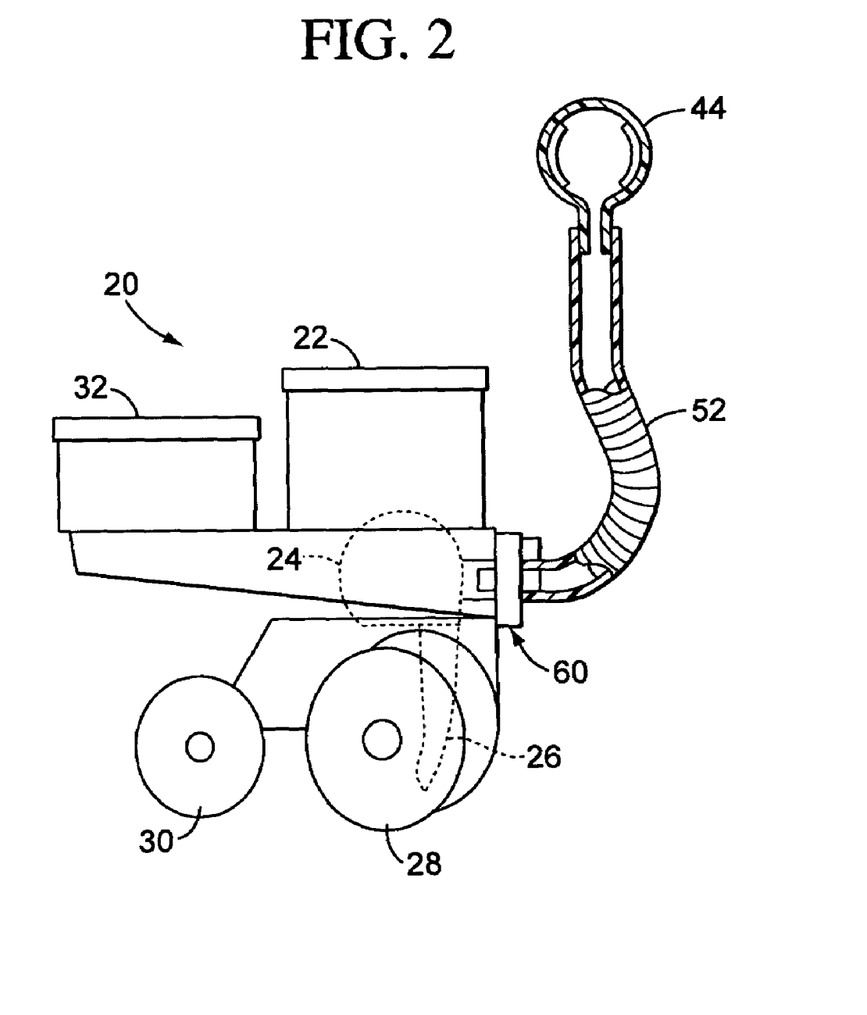
FIG. 2 is a semi-schematic side view of one planting unit and the pneumatic distribution system associated therewith.

FIG. 2 illustrates each of the row crop planting units 20 is provided with a seed hopper 22 that directs seed to a seed meter 24 which meters the seed. The metered seed is directed by a seed tube 26 from the seed meter 24 to a planting furrow formed in the ground by furrow opener 28. A planting furrow is closed by angled closing wheels 30. The planting unit may also be provided with a pesticide hopper 32 for carrying pesticides to be applied during the planting process.

The seed meter 24, in the illustrated embodiment, is a vacuum meter of the type presently marketed by the assignee of the present application. A vacuum seed meter is disclosed for example in U.S. Pat. No. 5,170,909 herein incorporated by reference. Negative air pressure is used to attract seeds to a seeding disc as it passes through a seed pile or puddle. The seeds remain in contact with the disc until the vacuum is removed and the seeds fall into the seed tube 26.

The seed meter 24 is connected to vacuum by a hose 52 that is connected to the manifold 44. A balancing orifice or valve 60 can be provided at each seed meter 24 or at selected seed meters.

Figure 3:
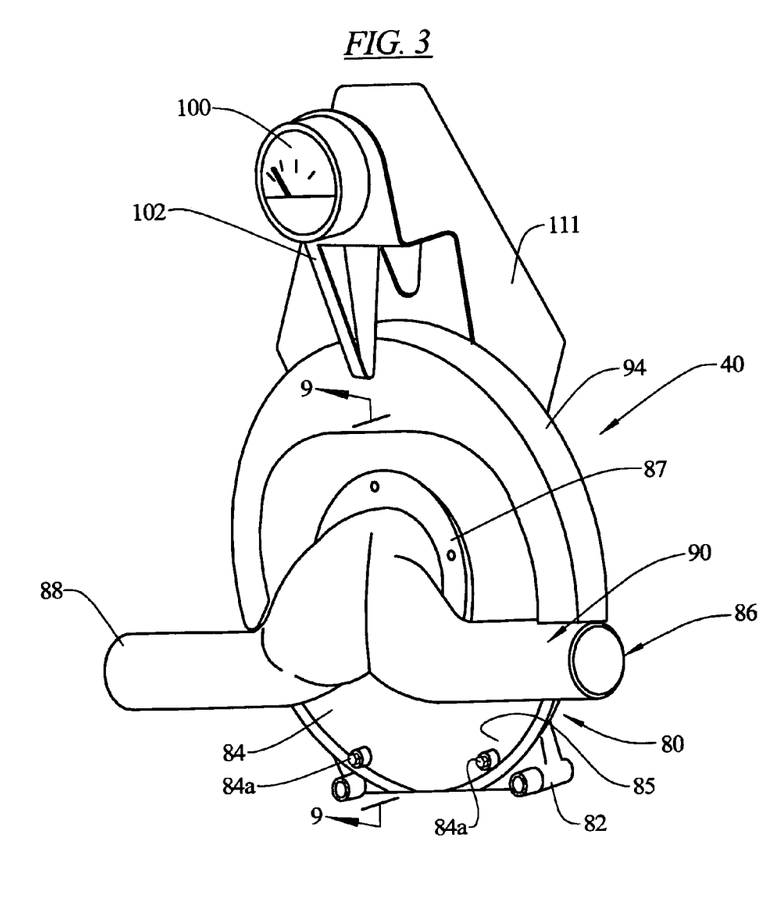
FIG. 3 is a front perspective view of a vacuum pump of the present invention.
Figure 5:
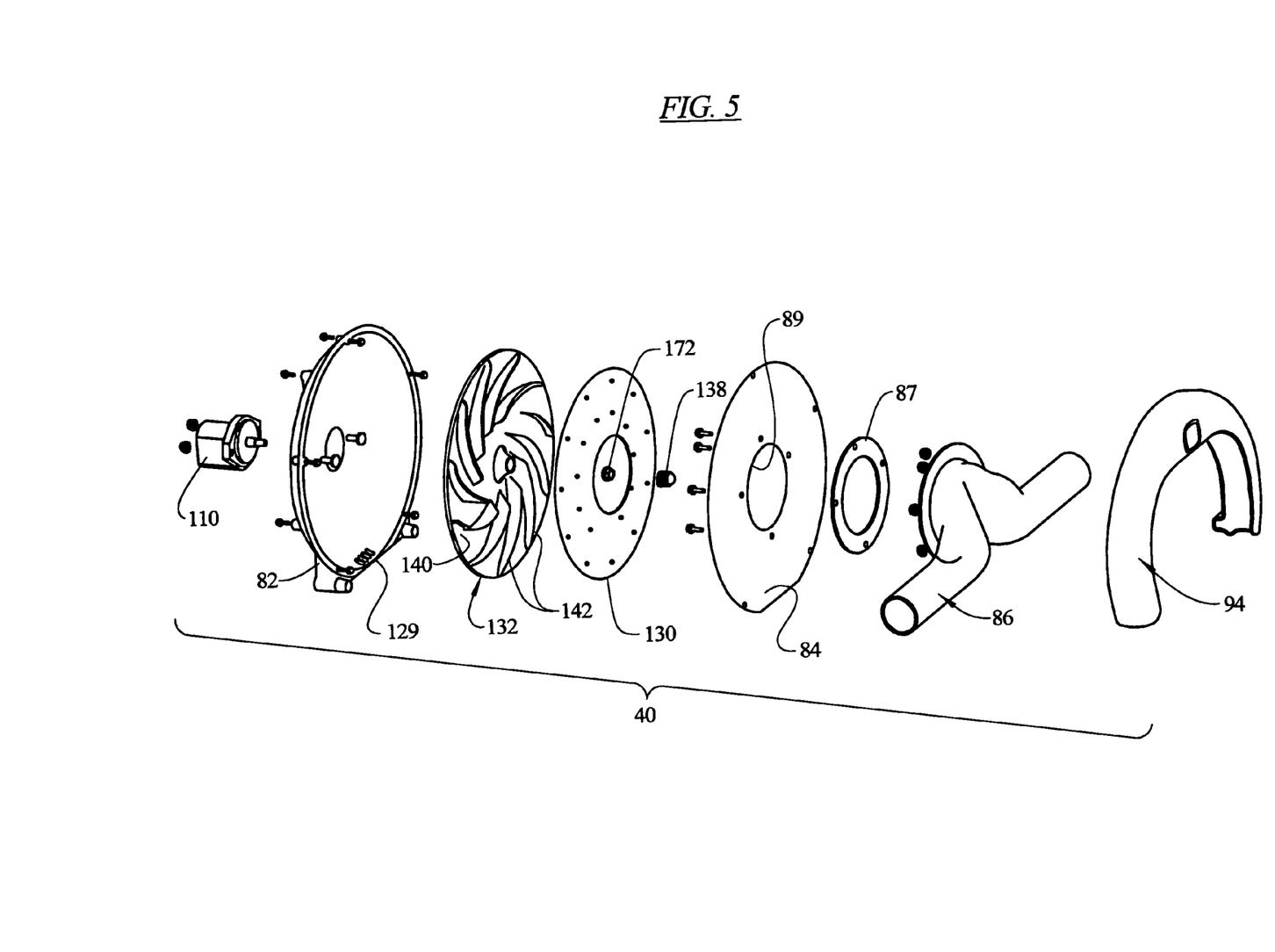
FIG. 5 is an exploded, perspective view of the vacuum pump of FIG. 3.
Figure 9:
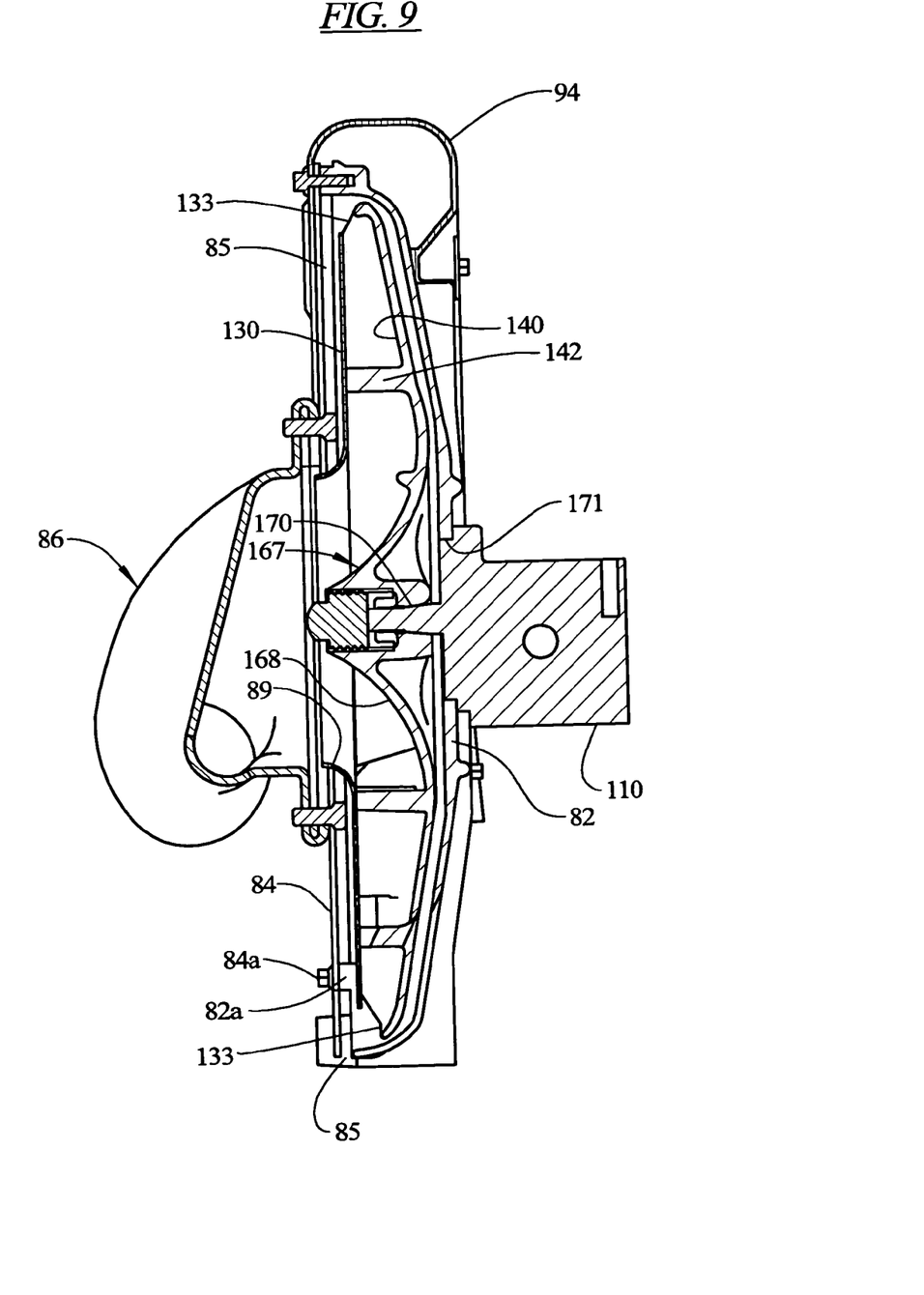
FIG. 9 is a sectional view taken generally along line 9—9 of FIG. 3.

FIG. 3 illustrates the vacuum pump 40 of the present invention. The vacuum pump 40 includes a housing 80 defined by a housing base 82 and a housing cover 84 fastened by fasteners 84a to bosses 82a of the housing base 82. The bosses 82a hold the cover 84 away from the base 82 a select amount, forming a substantially 360 degree annular air passage 85 between the cover 84 and the base 82 as shown in FIG. 9. An inlet manifold 86 is bolted to the cover 84 with an intervening foam baffle or gasket 87, over a central opening 89 (FIGS. 5 and 9). The inlet manifold 86 includes an inlet nozzle 88 that connects to the hose 42 shown in FIG. 1, and an inlet nozzle 90 that connects to the hose 43 shown in FIG. 1. Fastened to the cover and housing is a debris shield 94, the function of which will be described below. A vacuum gauge 100 is supported by a bracket 102, fastened to the shield 94.

Figure 4:
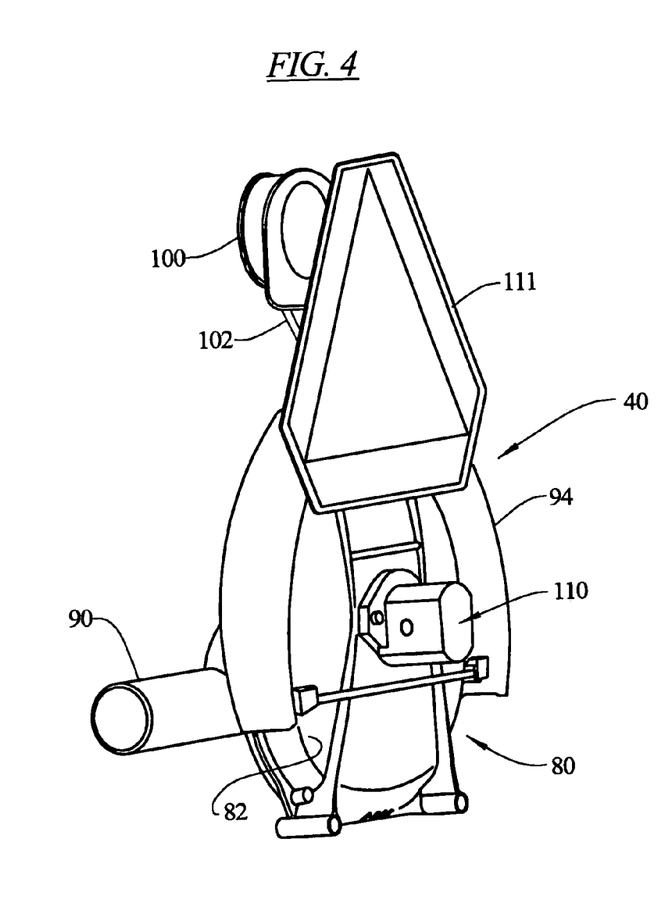
FIG. 4 is a rear perspective view of the vacuum pump of FIG. 3.

FIG. 4 illustrates a hydraulic motor 110 (shown schematically) bolted to the housing 80. The hydraulic motor is typically about five horsepower or less. A "slow-moving vehicle" ("SMV") sign 111 is supported by the bracket 102 fastened to the shield 94 and the housing 80.

FIG. 5 illustrates an exploded view of the vacuum pump 40. Also shown are debris drain slots 129 formed through the housing base 82. The slots 129 allow for the removal of debris which collects between the housing 80 and the impeller assembly 128 described below.

Figure 6:
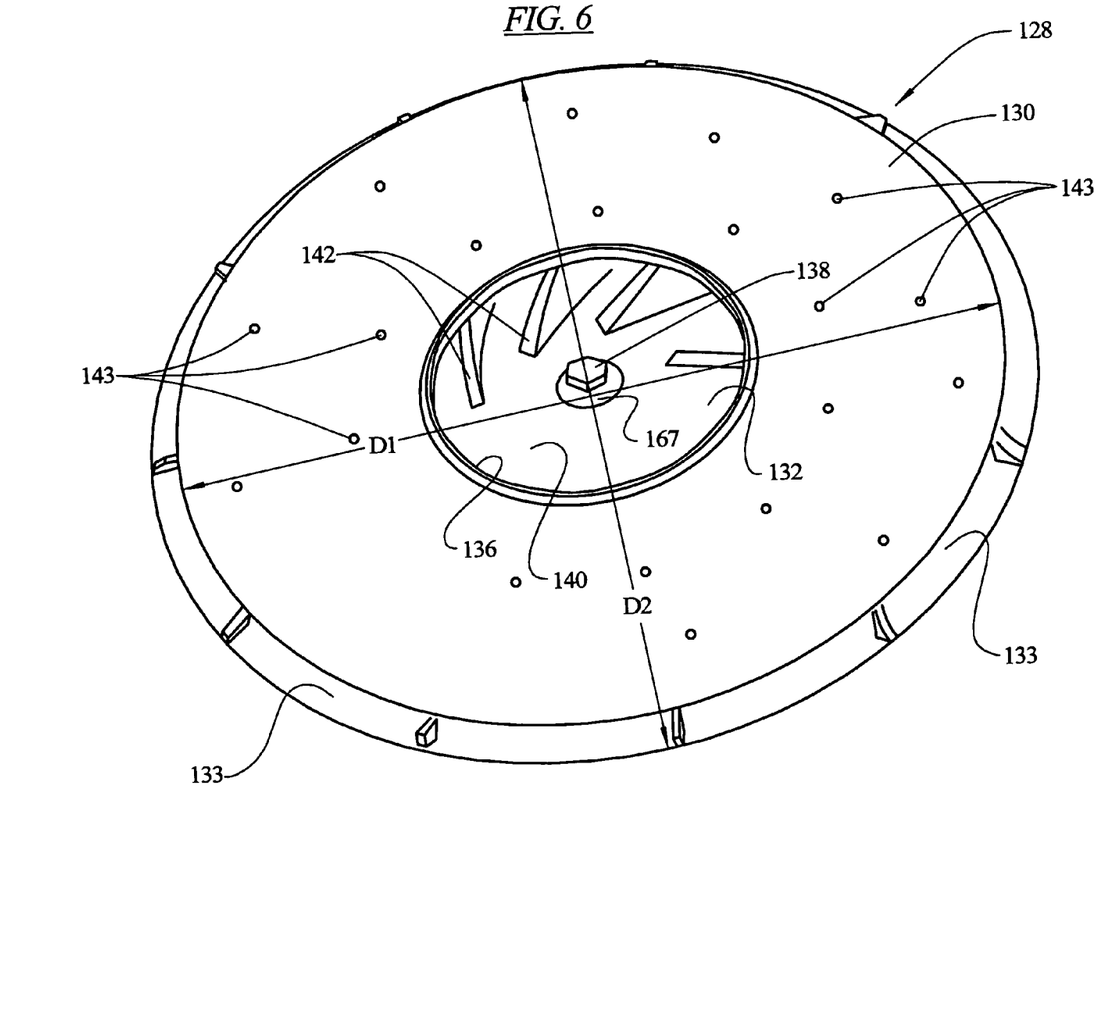
FIG. 6 is a front perspective view of an impeller, removed from the pump of FIG. 3.

FIG. 6 illustrates an impeller assembly 128 that is fit between the housing base 82 and the housing cover 84. An inlet face of the impeller assembly is defined by a shroud 130. The shroud 130 is fastened to an impeller body 132. The shroud 130 has a lesser outside diameter D1 than an outside diameter D2 of the impeller body 132, forming a 360 degree outlet 133 of the pump that is part radially directed and part axially directed as shown in FIG. 9. The shroud 130 includes a circular central opening 136 that serves as the central inlet of the impeller. A center threaded cap 138 is used to cover the attachment of the hydraulic motor 110 to the impeller assembly 128.

Figure 7:
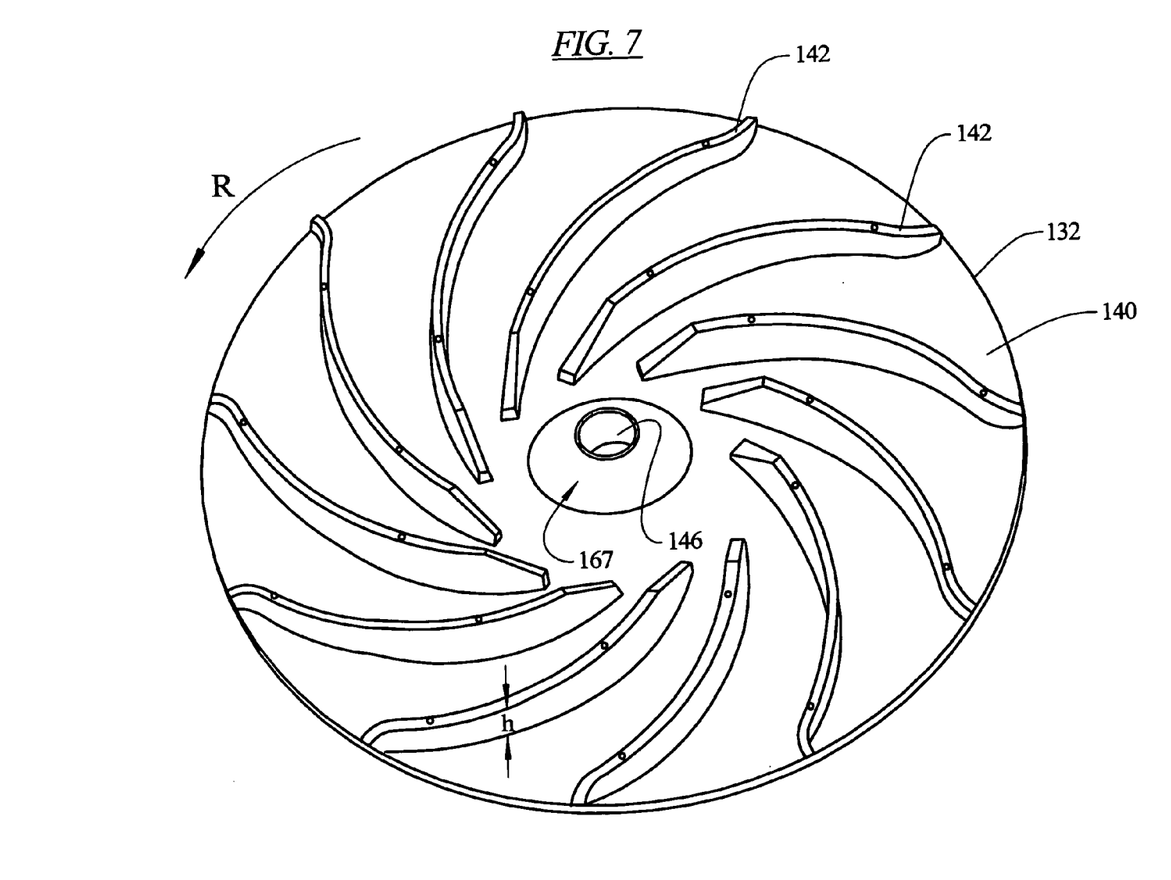
FIG. 7 is a front perspective view of an impeller body removed from the impeller of FIG. 6.

FIG. 7 illustrates the impeller body 132 removed from the assembly 128 shown in FIG. 6. The impeller body 132 includes a base 140 upon which are formed a plurality of curved vanes 142. The design of each impeller fan is such that the vane height "h" from the base 140 is greater at the center of the impeller body 132 and tapers as the vane extends radially. This change in height "h" is designed such that the cylindrical area of the air pumped radially through the impeller remains substantially constant. The shroud 130 is fastened by 22 fasteners 143, two fasteners threaded into each impeller vane 142. Before fastening, a layer of adhesive or sealer is applied between the facing surfaces of the vanes 142 and the shroud 130. The impeller body 132 includes a composite central aperture 146 at a center thereof.

Figure 8:
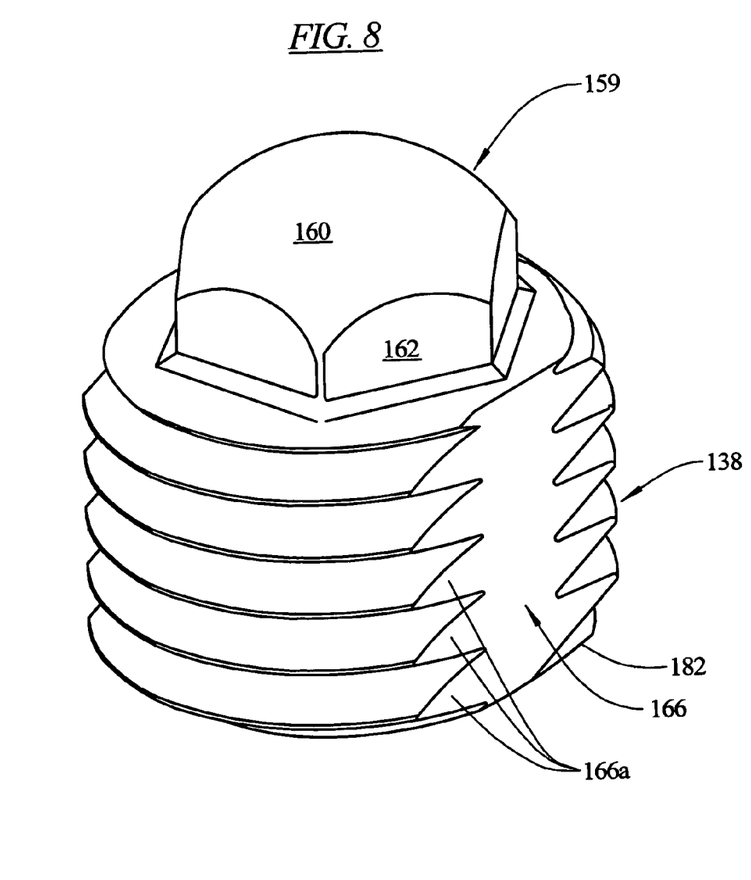
FIG. 8 is a perspective view of a cap taken from the impeller of FIG. 6.

FIG. 8 illustrates the threaded cap 138 in more detail. The cap 138 includes a head portion 159 that is exposed in the central opening 136 of the impeller. The head portion 159 includes a dome region 160 that is formed with a tool-engagable hexagonal region or nut region 162. The head portion 159 is fixed to, or formed with, a threaded shank portion 166. The threaded shank portion 166 has external threads 166a that thread into the threaded region 146a of the aperture 146 in the impeller base 140.

Figure 9A:
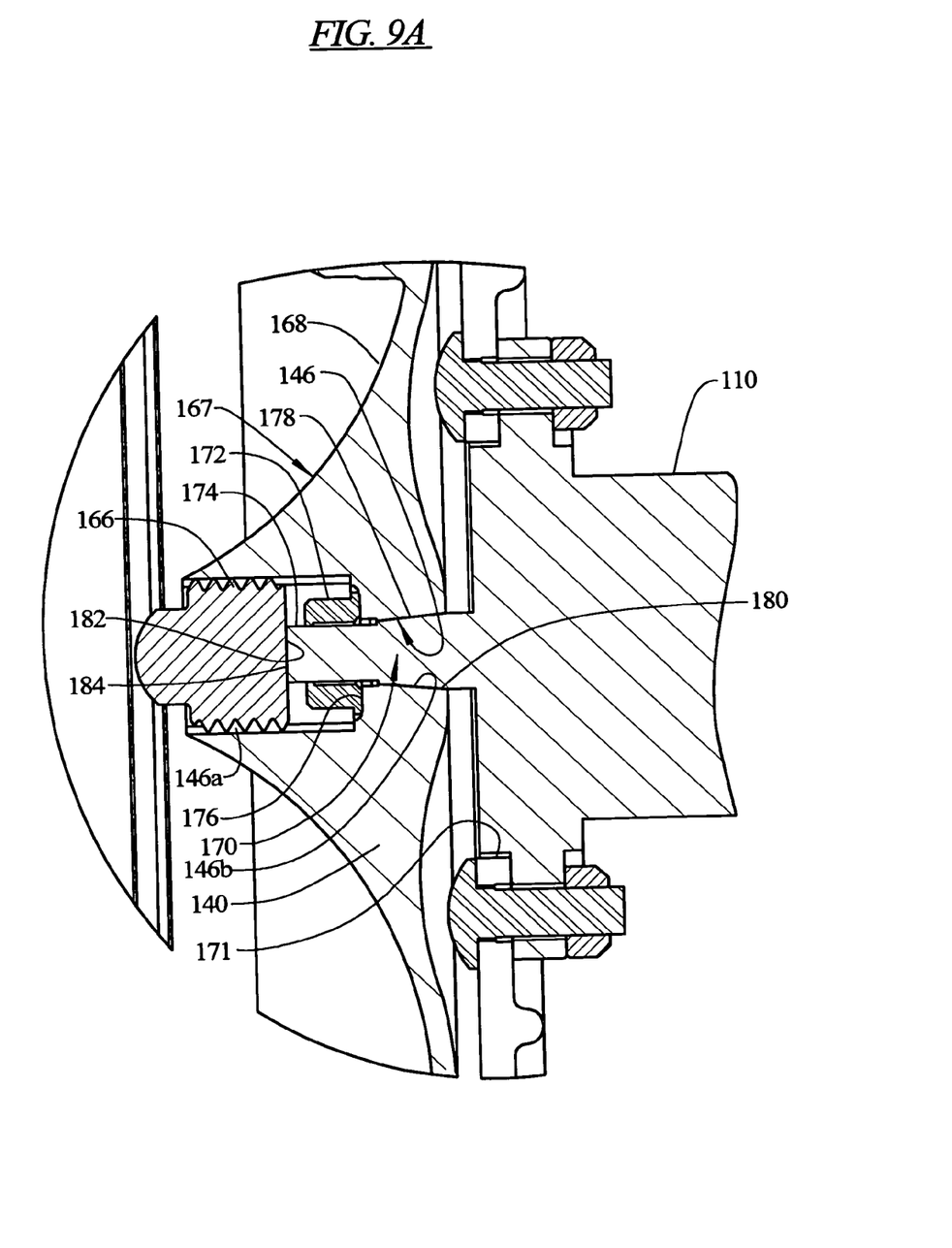
FIG. 9A is an enlarged sectional view taken from FIG. 9.
Figure 9B:
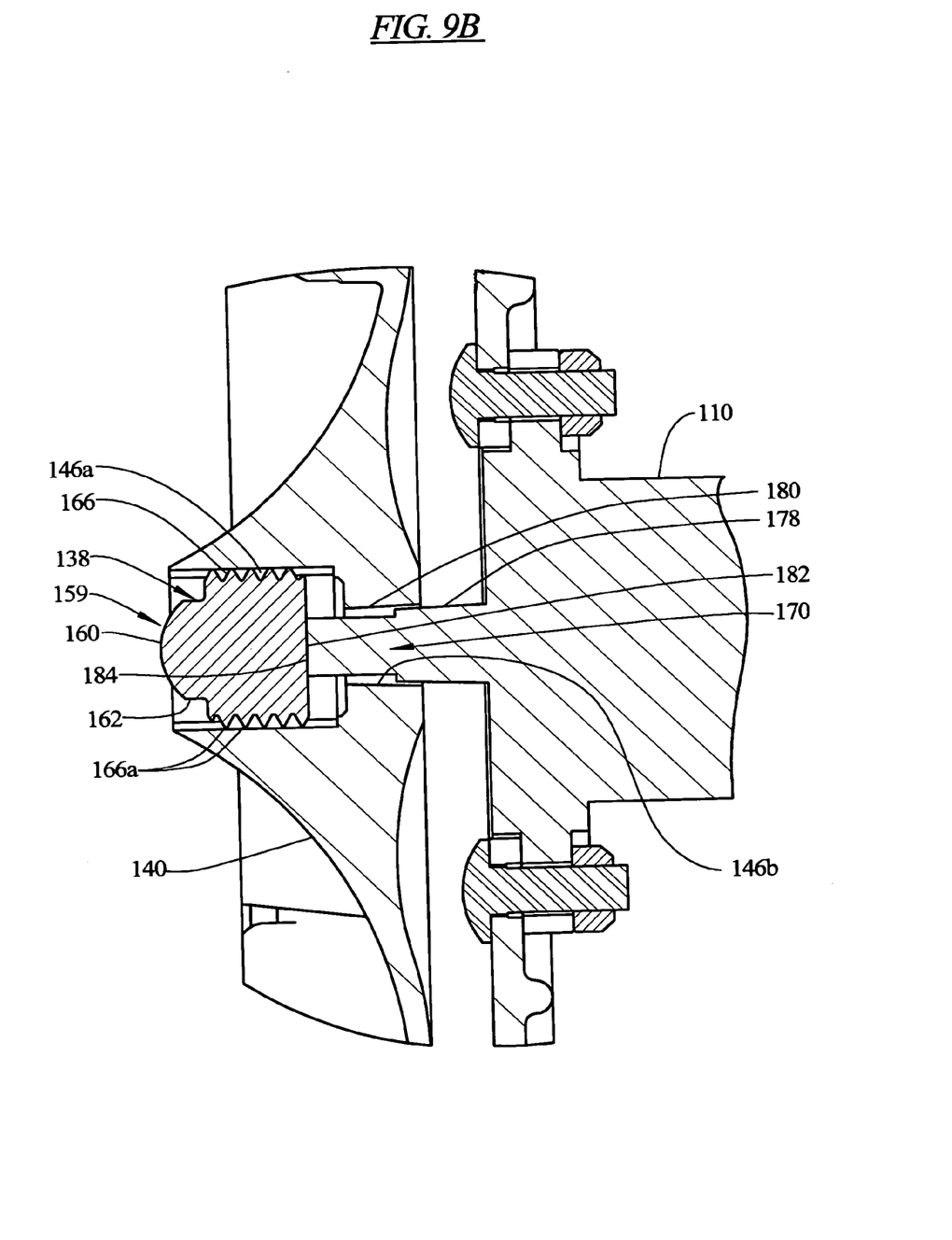
FIG. 9B is an enlarged sectional view similar to FIG. 9A showing the impeller being disassembled from the motor shaft.

FIGS. 9–9B illustrate the vacuum pump 40 in cross-section. The impeller body 132 includes a center hub 167 having a curved, conical surface 168. The motor 110 has an output shaft 170 that penetrates a plain (not threaded) shaft opening 171 of the housing base 82. The shaft 170 is locked axially to the impeller by penetrating a plain region 146b of the aperture 146 and therein being engaged by a nut 172 that is tightened onto a threaded end 174 of the output shaft, the nut bearing against a shoulder 176 of the impeller base 140.

As shown in FIG. 9A, the shaft 170 and the aperture 146 have co-acting tapered regions 178,180 causing the shaft 170 and the impeller base 140, around the aperture 146, to seize together radially. The shaft 170 can also be axially keyed to the impeller body 132 along the region 146b.

The threaded shank portion 166 of the cap 138 is threaded into the threaded region 146a of the aperture 146 and covers the nut 172. The threaded shank portion 166 is screwed into the threaded region 146a until an end 182 of the shank portion 166 abuts an end 184 of the shaft 170.

To remove the impeller from the motor output shaft 170 for maintenance or replacement, the cap 138 is unscrewed and removed, and the nut 172 is unscrewed and removed. At this point, the impeller body 132 is effectively press fit onto the shaft and manual removal is difficult. According to this aspect the invention, as shown in FIG. 9B, the cap 138 can be screwed back into the aperture 146, until the end 182 of the shank portion 166 abuts the end 184 of the shaft 170. Further tightening of the cap 138 then drives the impeller assembly 128 off the shaft 170 in the axial direction. In other words, the force generated by the center cap being reinstalled into the threaded region 146a of the aperture 146 slides the impeller assembly 128 off the taper 178 on the shaft 170.

As shown in FIGS. 6, 7 and 9, the center hub 167 surrounds the compound aperture 146. The center hub 167 provides for a smooth flow transition from the inlet 136 of the impeller assembly 128 to the passages between the vanes 142.

The impeller center cap 138, particularly the head portion 159 also helps to eliminate a stagnant air spot in the center region of the impeller assembly 128 and begins to impart radial movement to the air, causing a smooth flow transition to the base ends of the vanes.

In operation, the impeller assembly 128 is rotated by the shaft 170, driven by the hydraulic motor 110, within the space defined by the housing 80. The direction of rotation "R" is shown in FIG. 7. Air is drawn into the seed meters 20, through the hoses 42, 43, and through the inlet nozzles 88, 90 and into the impeller assembly 128. The air is pumped by rotation of the impeller assembly radially outward by the vanes 142, through the opening 133 and out through the annular passage 85 formed by the housing cover 84 being spaced from the housing base 82. Dust, small seeds, and debris passing through the passage 85 are directed in a downward direction by the shield 94.

The impeller of the invention allows air to be discharged from the impeller in a 360 degree pattern and avoids channeling the air into a single air stream. This allows the impeller size to be increased without significantly increasing the overall size of the pump. For example, the current JOHN DEERE 1700 series seed planter vacuum pump impeller is 277 mm in diameter whereas the impeller according to the preferred embodiment of the invention is 432.8 mm in diameter. The larger diameter impeller generates a higher pressure drop at 5000 rpm than the current production impeller generates at 8000 rpm with housings of approximately the same size.

The area of the shield 94 has been minimized such that the overall size does not exceed the overall size envelope of the existing design by a more than about 38.7 mm (1.52 in.) in any direction.

The vacuum pump of the invention can generate more vacuum than the current JOHN DEERE 1700 series seed planter vacuum pump and at lower rpm. The pump can be disassembled without any special pull tools. The center cap for the impeller can be used to remove the impeller from the motor shaft.

The center transition of the impeller improves the performance of the assembly by channeling the air stream to the vanes and eliminating the stagnant air in the typical centrifugal fan design. The overall size of the assembly is smaller than known pumps which generate equivalent level of vacuum for seed planter applications.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A vacuum pump for a vacuum controlled seed planter, comprising:
    a housing having a central air inlet and an air outlet passage;
    an impeller arranged to rotate about an axis within said housing, said air outlet passage of said housing being substantially evenly distributed around said axis, said impeller having a central air opening in fluid communication with said central air inlet, and a plurality of vanes extending radially from base ends to distal ends, said base ends being closer than said distal ends to said central opening, said vanes defining air paths that are open to said air outlet passage; and
    a rotary drive having an output shaft fixed for rotation with said impeller.

2. The vacuum pump according to claim 1, wherein said vanes are curved.

3. The vacuum pump according to claim 1, wherein said housing comprises a housing base and a housing cover fastened to said housing base.

4. The vacuum pump according to claim 3, wherein said housing cover is planar and wherein said outlet passage is arranged between said housing cover and said housing base, and wherein said housing base is concave.

5. The vacuum pump according to claim 1, further comprising a debris shield, said debris shield arranged at least partially around a circumference of said housing to terminal ends located below a horizontal diameter of said housing to direct particles passing through said outlet passage in a substantially downward direction.

6. The vacuum pump according to claim 5, wherein said debris shield is fastened to said housing and extends partially around said housing in an axial direction.

7. The vacuum pump according to claim 1, wherein said impeller comprises an impeller base and an impeller shroud, spaced apart by said vanes, said shroud having said central air opening, wherein said impeller base includes a curved, substantially conical, central hub in registry with said central air opening.

8. The vacuum pump according to claim 7, wherein said vanes include a height between said impeller base and said shroud that is decreasing in a radial direction such that a circumferential flow area through the impeller remains substantially constant along a radial direction.

9. The vacuum pump according to claim 1, wherein said outlet passage of said housing is open substantially 360° about said axis.

10. The vacuum pump according to claim 9, wherein said housing comprises a housing base and a housing cover fastened to said housing base, and wherein said housing cover is planar and wherein said outlet passage is arranged between said housing cover and said housing base, and wherein said housing base is concave.

11. A vacuum pump for a vacuum controlled seed planter, comprising:
    a housing having a central inlet and a circumferentially arranged outlet passage;
    an impeller arranged within said housing, said impeller having a central opening in fluid communication with said central inlet, and a plurality of vanes extending radially from base ends to distal ends, said base ends being closer than said distal ends to said central opening, said vanes defining air paths that are open to said circumferentially arranged outlet passage;
    a rotary drive having an output shaft fixed for rotation with said impeller;
    wherein said housing comprises a housing base and a housing cover fastened to said housing base; and
    wherein said housing base comprises a shaft opening, said output shaft penetrating said shaft opening, wherein said impeller comprises a central aperture for receiving said output shaft and for coupling said output shaft to said impeller, said central aperture having a threaded region, and a cap screwed into said threaded region of said central aperture, said cap having a head portion extending into a central region of said impeller substantially between diametrically opposed base ends of two of said vanes.

12. The vacuum pump according to claim 11, wherein said output shaft comprises a threaded end portion and said impeller is secured to said output shaft by a nut tightened on said threaded end portion, and said impeller comprises a shoulder within said central aperture, said nut bearing against said shoulder when tightened on said threaded end portion, and wherein when said cap is threaded into said threaded region to a first depth, said cap bears against an end of said shaft, and wherein when said nut is removed and said cap is threaded into said threaded region to a second, greater depth, said shaft is displaced axially with respect to said impeller.

13. The vacuum pump according to claim 11, wherein said vanes are curved.

14. A vacuum pump for a vacuum controlled seed planter, comprising:
    a housing having a central inlet and a circumferentially arranged outlet passage;
    an impeller arranged within said housing, said impeller having a central opening in fluid communication with said central inlet, and a plurality of vanes extending radially from base ends to distal ends, said base ends being closer than said distal ends to said central opening, said vanes defining air paths that are open to said circumferentially arranged outlet passage;
    a rotary drive having an output shaft fixed for rotation with said impeller; and
    wherein said housing comprises a first wall and a second wall fastened to said first wall defining a volume therebetween;
    wherein said outlet passage is arranged between said first wall and said second wall;
    wherein one of said first wall and said second wall comprises a shaft opening, said output shaft penetrating said shaft opening, wherein said impeller comprises a central aperture for receiving said output shaft and a cap screwed into said central aperture, said cap having a head portion extending into a central region of said impeller substantially between diametrically opposed base ends of two of said vanes.

15. The vacuum pump according to claim 14, wherein said output shaft comprises a threaded end portion and said impeller is secured to said output shaft by a nut tightened on said threaded end portion, and said impeller comprises a shoulder within said central aperture, said nut bearing against said shoulder when tightened on said threaded end portion, and wherein when said cap is threaded into said threaded region to a first depth, said cap bears against an end of said shaft, and wherein when said nut is removed and said cap is threaded into said threaded region to a second, greater depth, said shaft is displaced axially with respect to said impeller.

* * * * *